(12) United States Patent
Ushiroda et al.

(10) Patent No.: US 7,734,402 B2
(45) Date of Patent: Jun. 8, 2010

(54) DRIVING-FORCE DISTRIBUTION CONTROL DEVICE

(75) Inventors: Yuichi Ushiroda, Okazaki (JP); Kaoru Sawase, Anjo (JP); Kazuhiko Aono, Kriya (JP); Makoto Sakata, Okazaki (JP); Kazufumi Hayashikawa, Nagoya (JP); Naoki Takahashi, Anjo (JP); Keiji Suzuki, Okazaki (JP); Takami Miura, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 94 days.

(21) Appl. No.: 12/051,604

(22) Filed: Mar. 19, 2008

(65) Prior Publication Data

US 2009/0062998 A1 Mar. 5, 2009

(30) Foreign Application Priority Data

Aug. 30, 2007 (JP) ............................. 2007-224160

(51) Int. Cl.
*G06F 7/00* (2006.01)
*G06F 17/00* (2006.01)

(52) U.S. Cl. ...................................... 701/69
(58) Field of Classification Search ................. 701/69
See application file for complete search history.

(56) References Cited

U.S. PATENT DOCUMENTS 6,345,869 B1* 2/2002 Matsuo et al. ........... 303/116.1
6,449,552 B2* 9/2002 Ohba et al. ................... 701/89
2003/0036837 A1* 2/2003 Katayama et al. ............. 701/69
2004/0059491 A1* 3/2004 Yoneda et al. ................ 701/69

FOREIGN PATENT DOCUMENTS

| JP | 63-078823 | 4/1988 |
| JP | 63-207761 | 8/1988 |
| JP | 06-092157 | 4/1994 |
| JP | 09-226558 | 9/1997 |
| JP | 2002-096651 | 4/2002 |
| JP | 2005-104233 A | 4/2005 |

* cited by examiner

*Primary Examiner*—Jack W. Keith
*Assistant Examiner*—Imran Mustafa
(74) *Attorney, Agent, or Firm*—Birch, Stewart, Kolasch & Birch, LLP

(57) ABSTRACT

A driving-force distribution control device includes a distributing mechanism, a distribution controller, an anti-skid brake system, an acceleration detector, a synthesized acceleration calculator and a control coefficient controller. The distributing mechanism is operable to variably distribute a driving force from an engine to individual drive wheels of a vehicle. The distribution controller is operable to control the distributing mechanism based on a running state of the vehicle. The acceleration detector is operable to detect a first acceleration in a front-rear direction and a second acceleration in a left-right direction of the vehicle. The synthesized acceleration calculator is operable to calculate a synthesized acceleration of the first acceleration and the second acceleration. The control coefficient controller is operable to indiscretely vary control coefficients for restricting the control of the distribution controller when the anti-skid brake system is activated, according to the calculated synthesized acceleration.

5 Claims, 2 Drawing Sheets

DRIVING-FORCE DISTRIBUTION CONTROL DEVICE

BACKGROUND

1. Field of the Invention

The present invention relates to a driving-force distribution control device for distributing a driving force properly to individual drive wheels of a vehicle.

2. Description of the Related Art

Drive wheels of an automobile is provided with a differential gear (a differential device) between the left wheels and the right wheels. As a result, the automobile can turn smoothly while allowing a difference in the rotating speed between the left-right wheels at the turning time. Generally in the case of a four-wheel drive vehicle, moreover, not only the aforementioned left-right wheel differential gear but also a differential gear (a center-diff) is disposed between the front wheels and the rear wheels so that the rotating speed difference between the front and rear wheels can be allowed.

In recent years, vehicles imaging to be used on rough roads, and vehicles imaging to be used for sporty driving are frequently provided with a differential limiting device for limiting the differential motion due to the differential gear. This differential limiting device is represented by a limited slip differential (LSD), which can be electrically or mechanically controlled to distribute a proper driving force to the desired drive wheels even if any drive wheel slips.

Further, there has been developed a driving force distributing system, which is intended not only for the case of a mere slip of drive wheels, but also positively activates the aforementioned LSD to improve the turning performances, the accelerating performances and the stability performances of the vehicle. This driving force distributing system is exemplified by a front-rear wheel driving-force distributing mechanism capable of changing the driving force distribution of the front-rear wheels, a left-right wheel driving force distributing mechanism capable of changing the driving force distribution of the left-right wheels, an electronic control LSD, an electronic control coupling or the like.

On the other hand, a vehicle equipped with an anti-skid brake system (ABS) has been developed and put into use so that the vehicle can be reliably decelerated while retaining its steerability during breaking.

Here, the vehicle having both the aforementioned driving-force distributing system and the ABS have a problem that the control by the driving-force distributing mechanism and the control by the ABS interfere with one another. For example, Japanese Patent Publication No. 2005-104233A discloses a technology that can solve that problem and improve the control affinity between the driving-force distributing system and the ABS. According to this technique of Japanese Patent Publication No. 2005-104233A, the control mode of the driving-force distributing system is suitably interchanged in response to the action/inaction of the ABS between an ordinary mode and a control mode (an ABS corresponding mode) that does not obstruct the effect by the ABS control, and in the ABS corresponding mode, switching depending on whether the road surface $\mu$ is a high $\mu$ (corresponding to a dry asphalt road surface) or a low $\mu$ (corresponding to a wet asphalt road surface). On the high-$\mu$ road, more specifically, the control by the left-right wheel driving-force distributing mechanism is given preference, but the control by the ABS is given preference for the longitudinal direction. On the low-$\mu$ road, the control mode is changed so that the entire control by the ABS is given preference. Moreover, the specific control modes of the driving-force distribution control are exemplified by the rotating speed difference control (a $\Delta N$ control) between the front-rear wheels and the left-right wheels, the acceleration corresponding control, the deceleration corresponding control and so on. On the high-$\mu$ road, the control is made to reduce the controlled variable only for the $\Delta N$ control. On the low-$\mu$ road, the controlled variable of the $\Delta N$ control is further reduced so that only the $\Delta N$ control is made without the acceleration corresponding control or the deceleration corresponding control.

In the aforementioned technique disclosed in Japanese Patent Publication No. 2005-104233A, the control mode of the driving-force distributing system during operation of the ABS basically switches two ABS corresponding modes (for the high-$\mu$ road and the low-$\mu$ road). Therefore, the technique raises a problem that the driving force cannot be finely distributed on an intermediate $\mu$ road (e.g., a wet asphalt road surface or the unpaved road), on a snow road of the road, or on an extremely low-$\mu$ road (e.g., a frozen road or on ice).

In case the road surface $\mu$ is near the switching threshold value of the two ABS corresponding modes, moreover, there arises another problem such a hunting or control under different modes despite the vehicle is running on the same a sudden change in the control from a normal run on a common road surface may occur and results in unstable control.

Among the various control modes of the driving-force distribution control, moreover, the acceleration corresponding control or the deceleration corresponding control, other than the $\Delta N$ control, belongs to either the controlled variable reducing or ON-OFF switching operation like that of the $\Delta N$ control. As a result, the fine reduction control matching the characteristics (i.e., the interfering degree to the control by the ABS) cannot be made and may raise a problem in the interference with the control by the ABS or the reduction in the control performance (e.g., the turning performances).

SUMMARY

According to one aspect of the invention, there is provided a driving-force distribution control device including: a distributing mechanism operable to variably distribute a driving force from an engine to individual drive wheels of a vehicle; a distribution controller operable to control the distributing mechanism based on a running state of the vehicle; an anti-skid brake system activated when the vehicle is braked so as to control braked states of the individual wheels thereby controlling slipping states of the individual wheels; an acceleration detector operable to detect a first acceleration in a front-rear direction of the vehicle and a second acceleration in a left-right direction of the vehicle; a synthesized acceleration calculator operable to calculate a synthesized acceleration of the first acceleration and the second acceleration; and a control coefficient controller operable to indiscretely vary control coefficients for restricting the control of the distribution controller when the anti-skid brake system is activated, according to the calculated synthesized acceleration.

BRIEF DESCRIPTION OF THE DRAWINGS

Embodiment may be described in detail with reference to the accompanying drawings, in which.

DETAILED DESCRIPTION OF THE INVENTION

A driving-force distribution control device according to one exemplary embodiment of the present invention is described in the following.

Figure 1:
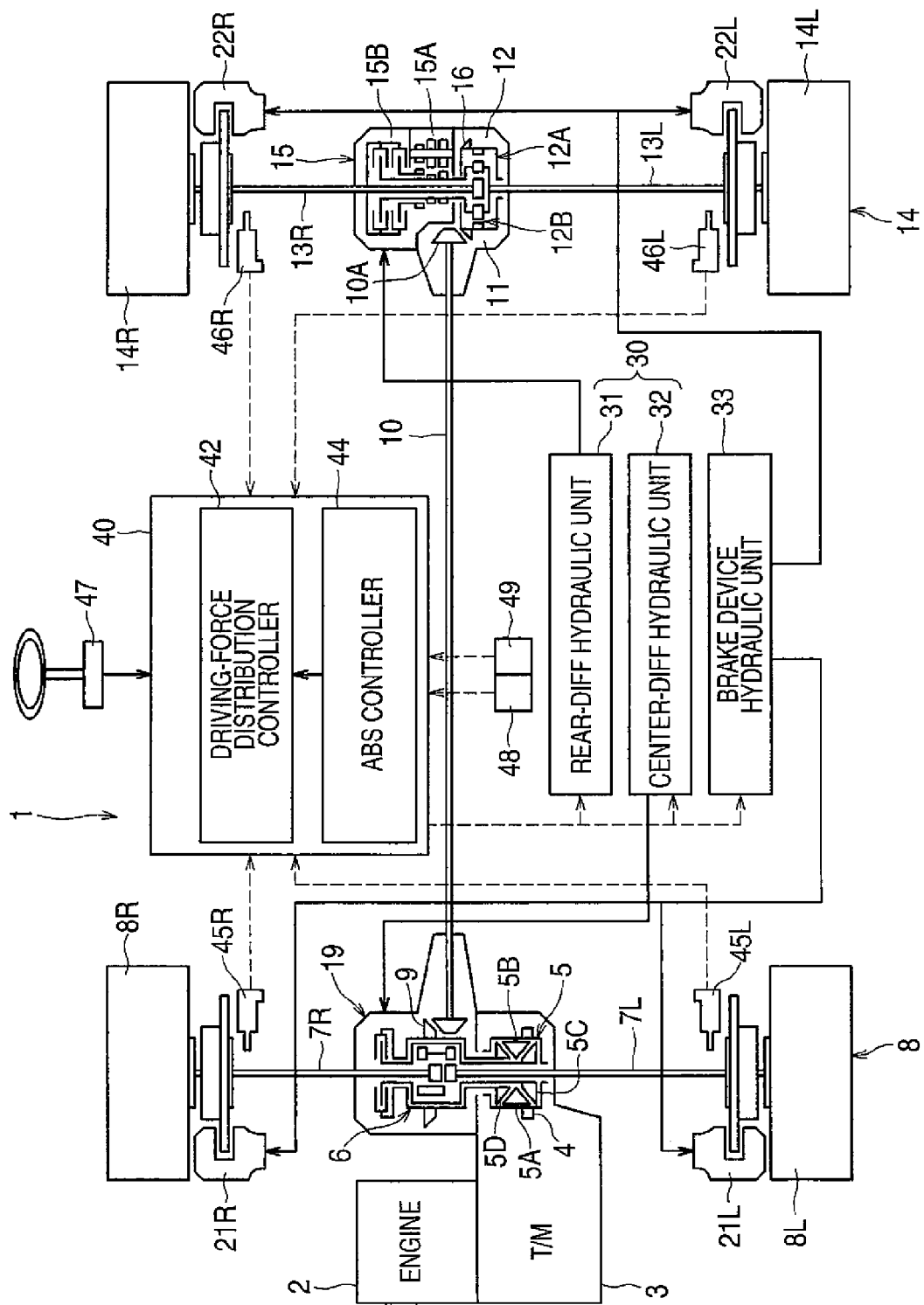
FIG. 1 is a block diagram showing schematically the constitution of the driving-force distribution control device according to one mode of embodiment of the present invention.

FIG. 1 is a schematic block diagram showing a constitution of the driving-force distribution control device according to the invention.

As shown in FIG. 1, a four-wheel drive vehicle 1, to which the driving-force distribution control device of the invention is applied, is provided with an engine 2, a transmission 3 and so on, so that the output of the engine 2 is transmitted through the transmission 3 and an intermediate gear mechanism 4 to a center differential (as will be called a center-diff) 5.

The output of the center-diff 5 is transmitted, on one hand, through a front differential (as will be called a front-diff) 6 from axles 7L and 7R to the left and right wheels 8L and 8R of front wheels 8 and, on the other hand, through a hypoid gear mechanism 9, a propeller shaft 10, a hypoid gear mechanism 11 on the rear wheel side and a rear differential (as will be called a rear-diff) 12 from axles 13L and 13R to the left and right wheels 14L and 14R of rear wheels 14.

Specifically, the center-diff 5 is constituted of differential pinions 5A and 5B, and side gears 5C and 5D for meshing with those differential pinions 5A and 5B. The torque, as inputted from the differential pinions 5A and 5B, is transmitted through one side gear 5C to the front wheels 8 and through the other side gear 5D and the propeller shaft 10 or the like to the rear wheels 14. At this time, the center-diff 5 allows the differential motions between the front wheels 8 and the rear wheels 14 and does not obstruct the turning performances of the vehicle 1.

To this center-diff 5, moreover, there is connected a front-rear wheel driving-force distributing mechanism (a driving-force distributing mechanism) 19, which acts as a driving-force distributing system to distribute the torque outputted from the engine 2 variably to the front-rear wheels 8 and 14 while limiting the differential variably, as allowed between the front wheels 8 and the rear wheels 14. This front-rear wheel driving-force distributing mechanism 19 is constituted of a wet type hydraulic multi-disc clutch mechanism, and can change properly the distribution of the torque (the driving force) to be transmitted to the front wheels 8 and the rear wheels 14, in accordance with the oil pressure fed from a drive line hydraulic unit 30, as will be described hereinafter.

To the front-diff 6, on the other hand, there is applied a torque-responding type differential gear, which limits the differential motions between the left and right wheels 8L and 8R in accordance with the magnitude of the torque inputted from the engine 2.

On the other hand, the rear-diff 12 has its case 12A equipped, on its outer circumference, with a crown gear 16 meshing with a pinion gear 10A at the rear end of the propeller shaft 10 and, on its inner circumference, with a planetary gear mechanism 12B. Moreover, this planetary gear mechanism 12B allows the differential motions between the left and right rear wheels 14L and 14R. By this constitution, the torque, as inputted from the engine 2 through the propeller shaft 10, the pinion gear 10A and so on to the crown gear 16, is transmitted to the left rear wheel 14L and the right rear wheel 14R while the differential motions between the two wheels 14L and 14R being allowed by the planetary gear mechanism 12B.

To the rear-diff 12, moreover, there is connected a left-right wheel driving-force distributing mechanism (a driving-force distributing mechanism) 15, which can change properly the distribution of driving forces to be transmitted to the left-right wheels 14L and 14R. This left-right wheel driving-force distributing mechanism 15 is constituted of a speed change mechanism 15A and a torque transmission mechanism 15B of a transmission capacity variable control type, so that it can also change the driving force (i.e., the torque) of the right wheel 14R and the left wheel 14L properly according to the running situations of the vehicle in response to the oil pressure fed from the drive-line hydraulic unit 30, as will also be described hereinafter.

The speed change mechanism 15A accelerates or decelerates the rotating speed of one (e.g., the left wheel 14L) of the left-right wheels, and outputs the changed speed to the torque transmission mechanism 15B.

The torque transmission mechanism 15B of the transmission capacity variable control type is a wet type hydraulic multi-disc clutch mechanism capable of adjusting the transmission torque capacity in response to the control oil pressure fed from the later-described drive-line hydraulic unit 30. The torque transmission mechanism 15B transfers the torque between the left-right wheels 14L and 14R by utilizing the rotating speed difference between the rotating speed accelerated or decelerated by the speed change mechanism 15A and the rotating speed of the other wheel (i.e., the right wheel 14R) of the left-right wheels, so that it can increase or decrease the driving torque of one wheel and can decrease or increase the driving torque of the other wheel. Here, the planetary gear mechanism 12B, the speed change mechanism 15A and the torque transmission mechanism 15B thus far described belong to the well-known technique, and the detailed descriptions of those individual structures are omitted.

Moreover, the vehicle 1 is provided with the drive-line hydraulic unit 30 for feeding the oil pressure to the left-right wheel driving-force distributing mechanism 15 and the front-rear wheel driving-force distributing mechanism 19. Specifically, the drive-line hydraulic unit 30 is constituted of a rear-diff hydraulic unit 31 for actuating the left-right wheel driving-force distributing mechanism 15 hydraulically, and a center-diff hydraulic unit 32 for actuating the front-rear wheel driving-force distributing mechanism 19 hydraulically. These rear-diff hydraulic unit 31 and the center-diff hydraulic unit 32 are connected with an electronic control unit (ECU) 40.

Here, each of the rear-diff hydraulic unit 31 and the center-diff hydraulic unit 32 is constituted to include an accumulator, a motor pump for raising pressure of the working oil in the accumulator to a predetermined pressure, and a pressure sensor or the like for monitoring the oil pressure raised by the motor pump, although not shown, and to include an electromagnetic control valve for regulating the oil pressure, as once regulated by the motor pump, to output the regulated pressure, and a direction-switching valve or the like for switching the feed destination of the oil pressure regulated by that electromagnetic control valve, to a (not-shown) predetermined oil chamber of the left-right wheel driving-force distributing mechanism 15.

The ECU 40 is equipped with a driving-force distribution controller (a driving-force distribution control unit) 42. As a matter of fact, the rear-diff hydraulic unit 31 and the center-diff hydraulic unit 32 are connected with the driving-force distribution controller 42.

The driving-force distribution controller 42 is equipped with a CPU, a ROM, a RAM, an interface and so on, and is connected, on its input side, with various sensors of not only wheel speed sensors 45R, 45L, 46R and 46L, a steering angle sensor 47, a G (e.g., longitudinal G and lateral G) sensor 48 and a yawing rate sensor 49 but also a throttle position sensor (although not shown). As a result, the rear-diff hydraulic unit 31 and the center-diff hydraulic unit 32 are actively controlled according to the output values which are operated by the driving-force distribution controller 42 in accordance with the running state of the vehicle detected by the various sensors such as the running states of the vehicle, i.e., the vehicle speed, the steering state and the running state of the vehicle body, so that it can control individually the actions of the left-right wheel driving-force distributing mechanism 15 and the front-rear wheel driving-force distributing mechanism 19.

In case the vehicle 1 is running forward while turning to the right, a predetermined oil pressure is inputted from the rear-diff hydraulic unit 31 to the left-right wheel driving-force distributing mechanism 15, so that the torque to be distributed to the right rear wheel 14R is decreased to decelerate the right rear wheel 14R whereas the torque to be distributed to the left rear wheel 14L is increased to accelerate the left rear wheel 14L. As a result, the rightward (clockwise) yawing moment can be established in the vehicle 1 thereby to improve the turning performances of the vehicle 1.

In case the vehicle 1 is running forward while turning to the left, a predetermined oil pressure is inputted from the rear-diff hydraulic unit 31 to the left-right wheel driving-force distributing mechanism 15, so that the torque to be distributed to the left rear wheel 14L is decreased to decelerate the left rear wheel 14L whereas the torque to be distributed to the right rear wheel 14R is increased to accelerate the right rear wheel 14R. As a result, the leftward (counter-clockwise) yawing moment can be established in the vehicle 1 thereby to improve the turning performances of the vehicle 1, too.

Moreover, the predetermined oil pressure is inputted from the center-diff hydraulic unit 32 to the front-rear wheel driving-force distributing mechanism 19 so that the differential motions between the front wheels 8 and the rear wheels 14 can be limited to improve the traction performances of the vehicle 1, or so that the differential motions between the front wheels 8 and the rear wheels 14 can be allowed to improve the turning performances of the vehicle 1.

Here, the vehicle 1 is provided with an anti-skid brake system (ABS), by which the individual wheels 8L, 8R, 14L and 14R of the vehicle 1 can be so controlled in their braked states independently of one another that the wheels 8L, 8R, 14L and 14R may be in the preferable slip states with respect to the road surfaces. This ABS is constituted of four brake devices 21L, 21R, 22L and 22R corresponding to the individual wheels 8L, 8R, 14L and 14R of the vehicle 1, respectively, an ABS controller 44 disposed in the ECU 40 for controlling those individual brake devices 21 and 22, and a brake device hydraulic unit 33 acting as a braking system hydraulic unit for feeding oil pressures according to the command from the ABS controller 44, to the individual brake devices 21 and 22.

The brake device hydraulic unit 33 is equipped with a motor pump, an electromagnetic control valve and so on, although not shown, for regulating the brake liquid pressure.

On the other hand, the ABS controller 44 is equipped with a CPU, a ROM, a RAM, an interface and so on, and is connected, on its input side, with various sensors of not only the wheel speed sensors 45R, 45L, 46R and 46L, the G (e.g., longitudinal G and lateral G) sensor 48 and the yawing rate sensor 49 but also a brake pedal depression sensor (although not shown). As a result, the brake device hydraulic unit 33 is actively controlled according to the output values which are operated on the basis of the information from the various sensors by the ABS controller 44, so that it can control individually the action states of the brake devices 21L, 21R, 22L and 22R.

Figure 2:
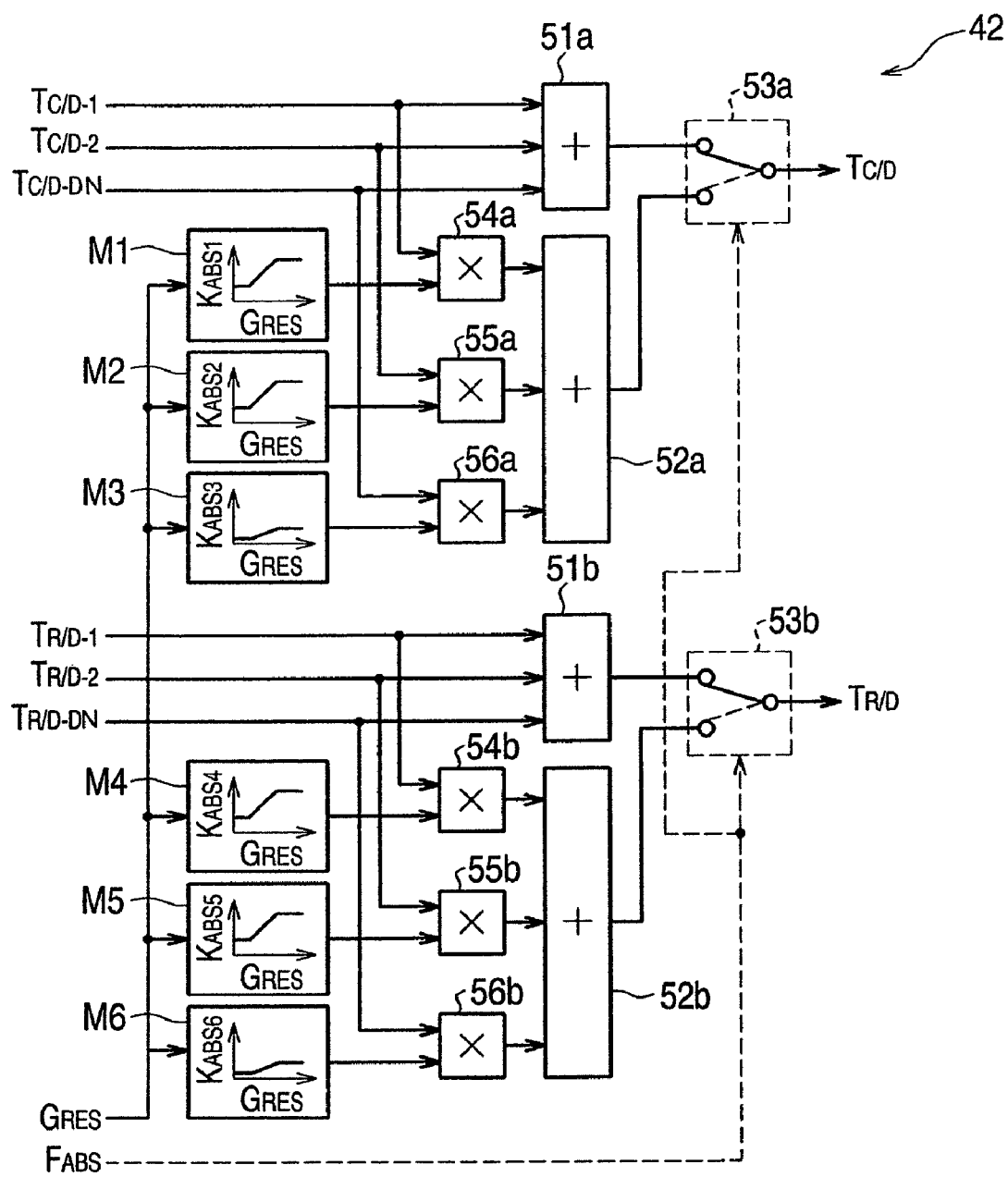
FIG. 2 is a schematic block diagram showing the constitution of a control system of the driving-force distribution control device according to the invention.

FIG. 2 is a schematic block diagram showing a constitution of a control system in the driving-force distribution controller 42 of the driving-force distribution control device thus constituted according to the invention. With reference to FIG. 2, here are described the control contents, as are executed in the driving-force distribution controller 42, of the driving-force distribution control device according to the invention.

In the driving-force distribution controller 42, as described above, on the basis of the information from the various sensors, the output values according to the running state of the vehicle are individually operated so that the action states of the left-right wheel driving-force distributing mechanism 15 and the front-rear wheel driving-force distributing mechanism 19 are controlled as the left-right wheel driving-force distribution control and the front-rear wheel driving-force distribution control, respectively. In the control modes of the left-right wheel driving-force distribution control and the front-rear wheel driving-force distribution control, more specifically, there are a plurality of control modes such as the "acceleration corresponding control", as based on the throttle opening or the steering angle, for preventing the initial slip of the wheels during an abrupt starting or for improving the vehicle responsibility turning, the "deceleration corresponding control", as based on the longitudinal acceleration, for retaining the stability of the vehicle position during an abrupt decelerating, and the "rotating speed difference control (ΔN control)", as based on the rotating speed differences between the individual wheels such as the front-rear wheels 8 and 14 and the left-right wheels 14L and 14R. The driving-force distribution controller 42 outputs signals corresponding to those plural controls.

In the driving-force distribution controller 42, as shown in FIG. 2: the output value $T_{C/D-1}$ of the front-rear wheel first control, the output value $T_{C/D-2}$ of the front-rear wheel second control and the output value $T_{C/D-DN}$ of the front-rear wheel ΔN control are outputted to correspond individually to the acceleration corresponding control, the deceleration corresponding control and the ΔN control of the front-rear wheel driving-force distributing mechanism 19; and the output value $T_{R/D-1}$ of the left-right wheel first control, the output value $T_{R/D-2}$ of the left-right wheel second control and the output value $T_{R/D-DN}$ of the left-right wheel ΔN control are outputted to correspond individually to the acceleration corresponding control, the deceleration corresponding control and the ΔN control of the left-right wheel driving-force distributing mechanism 15.

As shown in FIG. 2, on the other hand, the driving-force distribution controller 42 is equipped with adders 51a, 52a, 51b and 52b, switches 53a and 53b, and multipliers 54a, 55a, 56a, 54b, 55b and 56b.

Moreover, the output value $T_{C/D-1}$ of the front-rear wheel first control, the output value $T_{C/D-2}$ of the front-rear wheel second control and the output value $T_{C/D-DN}$ of the front-rear wheel ΔN control thus far described are inputted to and added by the adder 51a, and are inputted through the multipliers 54a, 55a and 56a and added by the adder 52a. On the other hand, the output value $T_{R/D-1}$ of the left-right wheel first control, the output value $T_{R/D-2}$ of the left-right wheel second control and the output value $T_{R/D-DN}$ of the left-right wheel ΔN control thus far described are inputted to and added by the adder 51b, and are inputted through the multipliers 54b, 55b and 56b and added by the adder 52b. In the switch 53a, moreover, the output from the adder 51a and the output value from the adder 52a are alternatively selected and are outputted as a front-rear wheel driving-force distribution controlled variable $T_{C/D}$. In the switch 53b, moreover, the output from the adder 51b and the output value from the adder 52b are alternatively selected and are outputted as a front-rear wheel driving-force distribution controlled variable $T_{R/D}$.

The switches 53a and 53b are constituted to be switched in response to the action states of the ABS. Specifically, when the ABS is actuated by the ABS controller 44, the ABS action decision is made in the driving-force distribution controller 42 to generate an ABS action signal $F_{ABS}$ so that the switches 53a and 53b are switched in response to that ABS action signal $F_{ABS}$. During the ABS inaction time, more specifically, the switches 53a and 53b are switched to the sides of the adders 51a and 51b, so that the output values $T_{C/D-1}$, $T_{C/D-2}$ and $T_{C/D-DN}$ or the output values $T_{R/D-1}$, $T_{R/D-2}$ and $T_{R/D-DN}$ are added and are outputted (i.e., in the ordinary mode) as they are as the front-rear wheel driving-force distribution controlled variable $T_{C/D}$ or the left-right wheel driving-force distribution controlled variable $T_{R/D}$. During the ABS action time, on the other hand, the switches 53a and 53b are switched to the sides of the adders 52a and 52b, so that the output values $T_{C/D-1}$, $T_{C/D-2}$ and $T_{C/D-DN}$ are added after through the multipliers 54a, 55a and 56a, or the output values $T_{R/D-1}$, $T_{R/D-2}$ and $T_{R/D-DN}$ are added after through the multipliers 54b, 55b and 56b, and are outputted (namely, in the ABS corresponding mode) as the front-rear wheel driving-force distribution controlled variable $T_{C/D}$ and the left-right wheel driving-force distribution controlled variable $T_{R/D}$.

As shown in FIG. 2, the multipliers 54a, 55a and 56a and the multipliers 54b, 55b and 56b are so constituted as to be fed with the output values of control maps M1, M2 and M3, and M4, M5 and M6. The control maps M1, M2 and M3, and M4, M5 and M6 are constituted to calculate, (a synthesized acceleration calculating unit), a synthesized acceleration (a synthesized acceleration vector) $G_{RES}$ on the basis of the longitudinal acceleration (the longitudinal G) and the lateral acceleration (the lateral G), which are detected by the G-sensor 48, and to input that synthesized acceleration $G_{RES}$.

The control maps M1, M2 and M3, and M4, M5 and M6 determine the gains $K_{ABS1}$, $K_{ABS2}$, $K_{ABS3}$, $K_{ABS4}$, $K_{ABS5}$ and $K_{ABS6}$ ($0 < K_{ABS1-6} < 1$) (control coefficients), which are individually multiplied on the output values $T_{C/D-1}$, $T_{C/D-2}$, $T_{C/D-DN}$, $T_{R/D-1}$, $T_{R/D-2}$ and $T_{R/D-DN}$ in the multipliers 54a, 55a and 56a and the multipliers 54b, 55b and 56b so as to adjust the preference of the ABS during the ABS action time, in accordance with the synthesized acceleration $G_{RES}$. These gains $K_{ABS1}$, $K_{ABS2}$, $K_{ABS3}$, $K_{ABS4}$, $K_{ABS5}$ and $K_{ABS6}$ are individually preset (a control coefficient setting unit) by experiments or the like for the individual output values $T_{C/D-1}$, $T_{C/D-2}$, $T_{C/D-DN}$, $T_{R/D-1}$, $T_{R/D-2}$ and $T_{R/D-DN}$.

The individual gain characteristics of the gains $K_{ABS1}$, $K_{ABS2}$, $K_{ABS3}$, $K_{ABS4}$, $K_{ABS5}$ and $K_{ABS6}$ are so seamlessly set that the gain values may continuously and gradually become larger toward value 1 as the synthesized acceleration $G_{RES}$ becomes higher when the synthesized acceleration $G_{RES}$ is at least within each predetermined range. Specifically, the synthesized acceleration $G_{RES}$, to which a control value approximated by the output values $T_{C/D-1}$, $T_{C/D-2}$ and $T_{C/D-DN}$ or the output values $T_{R/D-1}$, $T_{R/D-2}$ and $T_{R/D-DN}$ during the ABS inaction time is added as it becomes higher, is outputted as the front-rear wheel driving-force distribution controlled variable $T_{C/D}$ or the left-right wheel driving-force distribution controlled variable $T_{R/D}$, so that the contribution factor of the ABS control is made small. Moreover, the output values $T_{C/D-1}$, $T_{C/D-2}$, $T_{C/D-DN}$, $T_{R/D-1}$, $T_{R/D-2}$ and $T_{R/D-DN}$ are limited according to the synthesized acceleration $G_{RES}$ within the region, in which the synthesized acceleration $G_{RES}$ is at least smaller than each predetermined range, so that the ABS control has an accordingly high preference.

Moreover, the individual gain characteristics of the gains $K_{ABS3}$ and $K_{ABS6}$ corresponding to the output value $T_{C/D-DN}$ of the front-rear wheel ΔN control and the output value $T_{R/D-DN}$ of the left-right wheel ΔN control are made such that the interference degree between the ΔN control and the ABS control is high. As a result, the gain value is small as a whole, that is, the output values $T_{C/D-DN}$ and $T_{R/D-DN}$ are largely limited as a whole so that the ABS control is preferred as much as possible.

Here, the synthesized acceleration $G_{RES}$ indicates the maximum acceleration (i.e., the maximum acceleration/deceleration or the maximum turning acceleration), which can be established in the situations of the ABS action, in which the drive wheels such as the front wheels 8 or the rear wheels 14 may slip. This is meant, from the general equation of the frictional force, that the value of the synthesized acceleration $G_{RES}$ at the ABS action time divided by a gravity acceleration Gg is substantially equal to a road surface μ (that is, $G_{RES}/Gg \approx \mu$).

According to the invention, more specifically, during the ABS action time, the synthesized acceleration $G_{RES}$ can be easily determined from the longitudinal acceleration and the lateral acceleration without providing any road surface μ detecting unit separately, and the road surface μ (i.e., the friction coefficient of the road surface) can be easily estimated on the basis of that synthesized acceleration $G_{RES}$, so that the synthesized acceleration $G_{RES}$ can be properly used for the control.

If the synthesized acceleration $G_{RES}$ is replaced by the road surface μ therefore, it can be said that the individual gain characteristics are set such that the gains $K_{ABS1}$, $K_{ABS2}$, $K_{ABS3}$, $K_{ABS4}$, $K_{ABS5}$ and $K_{ABS6}$ restrict the output values $T_{C/D-1}$, $T_{C/D-2}$, $T_{C/D-DN}$, $T_{R/D-1}$, $T_{R/D-2}$ and $T_{R/D-DN}$ more as the road surface has the lower and prefers the front-rear wheel driving force distribution control or the left-right wheel driving force distribution control more for the higher μ road.

In the driving-force distribution control device according to the invention, as has been described hereinbefore, during the ABS action time, the values, which are calculated such that the output value $T_{C/D-1}$ of the front-rear wheel first control, the output value $T_{C/D-2}$ of the front-rear wheel second control and the output value $T_{C/D-DN}$ of the front-rear wheel ΔN control from the driving-force distribution controller 42 are multiplied by the gains $K_{ABS1}$, $K_{ABS2}$ and $K_{ABS3}$, respectively, by the multipliers 54a, 55a and 56a, are added by the adder 52a and are outputted as the front-rear wheel driving-force distribution controlled variable $T_{C/D}$. At the same time, the values, which are calculated such that the output value $T_{R/D-1}$ of the left-right wheel first control, the output value $T_{R/D-2}$ of the left-right wheel second control and the output value $T_{R/D-DN}$ of the left-right wheel ΔN control are multiplied by the gains $K_{ABS4}$, $K_{ABS5}$ and $K_{ABS6}$, respectively, by the multipliers 54b, 55b and 56b, are added by the adder 52b and are outputted as the left-right wheel driving-force distribution controlled variable $T_{R/D}$.

As a result, during the ABS action time, on the basis of the seamless gain $K_{ABS1-6}$ according to the synthesized acceleration $G_{RES}$ or the road surface μ, the controlled variable of the driving-force distribution control can be finely adjusted from the low-μ road to the high-μ load, so that the driving-force distribution control and the ABS control can be properly executed without any abrupt change of the controlled variable even against the abrupt change of the road surface μ.

Individually for the left-right wheel driving-force distribution control and the front-rear wheel driving-force distribution control, moreover, the various controlled variables (e.g., the "acceleration corresponding control", the "deceleration corresponding control" and the "ΔN control") on the driving-force distributions are calculated on the basis of the individual gains $K_{ABS1}$, $K_{ABS2}$, $K_{ABS3}$, $K_{ABS4}$, $K_{ABS5}$ and $K_{ABS6}$ which increase in response to the increase in the synthesized acceleration $G_{RES}$ or the road surface μ. From the low-μ road to the high-μ road, therefore, it is possible to properly execute the left-right wheel driving-force distribution control and the front-rear wheel driving-force distribution control individually. While the control interference between the driving-force distribution control and the ABS control being sufficiently suppressed according to the degree of the individual control interference between the various controls and the ABS control, moreover, the driving-force distribution control and the ABS control can be so properly executed without any drop of the control performances (e.g., the turning performances) and the ABS control that the ABS control may be preferred the more for the low-μ road.

In the control mode of the driving-force distribution control, especially the degree of interference between the ΔN control and the ABS control is high so that the gain value of the ΔN control is reduced as a whole. The output values $T_{C/D-DN}$ and $T_{R/D-DN}$ are largely limited as a whole so that the ABS control is preferred as high as possible. While sufficiently suppressing the control interference between the driving-force distribution control and the ABS control by the ΔN control, therefore, the driving-force distribution control and the ABS control can be properly executed without any drop of the control performances (the turning performances).

Even if the road surface belongs to an intermediate μ-road (e.g., a wet asphalt road surface or an unpaved road), a low-μ road such as a snow-covered road, or an extremely low-μ road (e.g., a frozen road or an icy road), therefore, the driving-force distribution control can be properly limited without any control interference between the driving-force distribution control and the ABS control, while preventing the driving-force distribution control and the ABS control being prevented from becoming unstable, and the ABS control can be properly preferred, so that the stability of the vehicle behaviors can be improved irrespective of the road surface μ.

Although the description of the mode of embodiment of the driving-force distribution control device according to the invention is thus far finished, the mode of embodiment should not be limited thereto.

In the embodiment, for example, the front-rear wheel driving-force distributing mechanism 19 or the left-right wheel driving-force distributing mechanism 15 has been applied as the driving-force distributing mechanism. Despite of this description, however, another mechanism (e.g., an electronic control LSD or an electronic control coupling) can also be applied as the driving-force distributing mechanism, if it can change the driving force to be transmitted from the engine to each wheel. The present invention can also be applied to the left-right wheel driving-force distributing device, as disclosed in JP-A-2005-289160.

In the aforementioned embodiment, moreover, the front-rear wheel driving-force distribution controlled variable $T_{C/D}$ and the left-right wheel driving-force distribution controlled variable $T_{R/D}$ are determined from the total sums of the individual controlled variables by using the adders 51a, 52a, 51b and 52b, although not limited thereto. For example, the added value of the maximum of either of the front-rear wheel first control output value $T_{C/D-1}$ and the front-rear wheel second control output value $T_{C/D-2}$ and the output $T_{C/D-DN}$ of the front-rear wheel ΔN control may be set as the front-rear wheel driving-force distribution controlled variable $T_{C/D}$, and the added value of the maximum of either of the left-right wheel first control output value $T_{R/D-1}$ and the left-right wheel second control output value $T_{R/D-2}$ and the output $T_{R/D-DN}$ of the left-right wheel ΔN control may be set as the left-right wheel driving-force distribution controlled variable $T_{R/D}$.

In the aforementioned embodiment, moreover, the various controls of the control modes of the driving-force distribution control are exemplified by the "acceleration corresponding control" (the front-rear wheel first control and the left-right wheel first control), the "deceleration corresponding control" (the front-rear wheel second control and the left-right wheel second control) and the "ΔN control" (the front-rear wheel ΔN control and the left-right wheel ΔN control), to which the control modes of the driving-force distribution control should not be limited.

Moreover, the foregoing embodiment has been described on the case, in which the driving-force distribution control is executed by the left-right wheel driving-force distributing mechanism 15 on the side of the rear wheels 14. However, the constitution may also be made such that the driving-force distributing system is equipped with the left-right wheel driving-force distributing mechanism on the side of the front wheels 8 thereby to execute the driving-force distribution control.

What is claimed is:

1. A driving-force distribution control device comprising:
a driving force distribution mechanism for variably distributing a driving force from an engine to each drive wheel, the driving force distribution mechanism having a front and rear wheel driving force distribution mechanism that changes a driving force distribution of front and rear wheels of the vehicle, and a left and right wheel driving force distribution mechanism that changes a driving force distribution of left and right wheels of the vehicle;
a driving force distribution controller that controls the driving force distribution mechanism in response to a running state of a vehicle, driving force distribution controller having a plurality of control modes including rotation seed difference control for controlling the driving force distribution mechanism by a control amount that corresponds to a rotation speed difference between at least one group of wheels selected from groups of the front and rear wheels, and left and right wheels;
an anti-skid brake system that controls a braking state of the each wheel so that a slip state of each wheel of the vehicle is turned into a suitable state during braking;
an acceleration detector that detects front and rear accelerations, and a lateral acceleration of the vehicle;
a synthesized acceleration calculator that calculates a synthesized acceleration obtained based on the detected front and rear accelerations, and the detected lateral acceleration;
a control coefficient setter that continuously sets a control coefficient for restricting a control amount of the driving force distribution controller during an operation of the anti-skid brake system in response to the calculated synthesized acceleration, the control coefficient setter continuously increasing a control coefficient, as the calculated synthesized acceleration increases, for each of the front and rear wheel driving force distribution mechanism and the left and right wheel driving force distribution mechanism, and continuously increasing a control coefficient, as the calculated synthesized acceleration increases, for each of the plurality of control modes to reduce priority of control for the anti-skid brake system, and at least decreasing the control coefficient to restrict a control amount of the rotational speed difference control during the operation of the anti-skid brake system as a whole as compared with other control mode, as the calculated synthesized acceleration increases; and the driving force distribution controller obtaining the control amount of the driving force distribution mechanism for each of the front and rear wheel driving force distribution mechanism and the left and right wheel driving force distribution mechanism based on the control coefficient obtained for each of the front and rear wheel driving force distribution mechanism and the left and right wheel driving force distribution mechanism, controlling the front and rear wheel driving force distribution mechanism and the left and right wheel driving force distribution mechanism, respectively, based on the obtained control amount, calculating an output value for each of the plurality of control modes based on the control coefficient obtained for each of the plurality of control modes, obtaining a control amount of the driving force distribution mechanism based on the calculated output value, and controlling the driving force distribution mechanism based on the obtained control amount.

2. The driving-force distribution control device according to claim 1, wherein the control coefficient is a coefficient K that is multiplied with a control amount of the driving force distribution mechanism and the coefficient K satisfies 0<K<1.

3. The driving-force distribution control device according to claim 1, wherein the control coefficient setter sets up a control coefficient so as to make a control amount of the driving force distribution controller during the operation of the anti-skid brake system nearly equivalent to a control amount of the driving force distribution controller during no operation of the anti-skid brake system.

4. The driving-force distribution control device according to claim 1, wherein:

the vehicle is provided with a throttle position sensor that detects a throttle opening level, a steering angle sensor that detects a steering angle of the vehicle, a front and rear acceleration sensor that detects front and rear accelerations, and a wheel speed sensor that detects a rotation speed difference between at least one group of wheels selected from groups of the front and rear wheels, and left and right wheels of the vehicle; and the plurality of control modes includes:

an acceleration response control based on the detected throttle opening angle and the detected steering angle at the time of a rapid acceleration;

a deceleration response control based on the detected front and rear accelerations at the time of a rapid deceleration; and a rotation speed difference control based on the detected wheel rotation speed difference.

5. The driving-force distribution control device according to claim 4, wherein:

as the calculated synthesized acceleration decreases, the control coefficient setter increases the control coefficient, such that each of a control amount of the acceleration response control and a control amount of the deceleration response control is smaller than a control amount of the rotation speed difference control, during the operation of the anti-skid brake system.

* * * * *